Patented June 18, 1929.

1,717,353

UNITED STATES PATENT OFFICE.

GUY H. BUCHANAN, OF WESTFIELD, NEW JERSEY, GEORGE BARSKY, OF NEW YORK, N. Y., AND KENNETH D. ASHLEY, OF ELIZABETH, NEW JERSEY, ASSIGNORS TO AMERICAN CYANAMID COMPANY, OF NEW YORK, N. Y., A CORPORATION OF MAINE.

PROCESS OF PRODUCING SALTS OF CARBOXYLIC ACIDS.

No Drawing. Application filed December 18, 1923. Serial No. 681,446.

This invention relates to the production of an oxalate, a formate, and of ammonia when a cyanide compound and a cyanamide compound react together. It comprises a new step in the art of nitrogen fixation by the cyanamide process in that it converts into a valuable commercial product not only the nitrogen component but also the carbon component of the cyanamide.

One of the objects of the invention is to avoid the production of the valueless calcium carbonate sludge which is ordinarily obtained when calcium cyanamide is subjected to the action of an autoclave to obtain ammonia, and to replace this calcium carbonate by calcium oxalate without reducing the yield of ammonia. An additional object is to increase the number and value of the intermediate and by-products so that the complete operation of extracting the nitrogen of the air in a combined form and disposing of all resulting products may be effected with substantial profit. With these and other objects in view the invention consists in the various steps and combinations of steps constituting the process, all as will be more fully hereinafter described and particularly pointed out in the claims.

As an example of the carrying out of the process we may add to 200 parts of water 31.5 parts of crude calcium cyanamide and 25 parts of crude calcium cyanide of the nature of that described in U. S. Patent No. 1,359,257, to Walter S. Landis, Nov. 16, 1920. This mixture is heated preferably for more than one hour and preferably for about 2 hours or more at a temperature corresponding to a steam pressure of about 100 pounds saturated steam. Under these conditions, the crude calcium cyanamide and crude calcium cyanide compounds react with each other and we recover substantially all of the combined nitrogen present in the form of ammonia while the solution and the suspended solids yield a large percentage of calcium formate and calcium oxalate respectively.

That the oxalate is not produced by a decomposition of the cyanide compound nor of the cyanamide compound alone, but by a reaction between the cyanide and the cyanamide compounds is shown by the fact that none or only small traces of calcium oxalate are produced under similar conditions when the cyanide compound or the cyanamide compond is heated alone. It is also shown by the fact that the sum of the calcium formate and the calcium oxalate compounds produced is more than the amount of these compounds that is theoretically obtainable from either the cyanide or the cyanamide when considered separately.

The reactions which take place seem to follow the following equations:

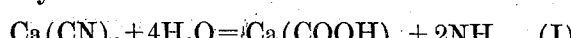

$$Ca(CN)_2 + 4H_2O = Ca(COOH)_2 + 2NH_3 \quad (I)$$

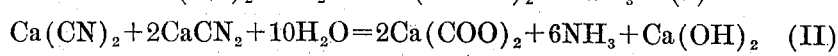

$$Ca(CN)_2 + 2CaCN_2 + 10H_2O = 2Ca(COO)_2 + 6NH_3 + Ca(OH)_2 \quad (II)$$

$$CaCN_2 + 3H_2O = CaCO_3 + 2NH_3 \quad (III)$$

Of these reactions (I) and (III) are well known reactions. Reaction (II) is a new reaction which does not appear to have been known heretofore. It is this last reaction which is the one most desired and which enables us to prepare oxalates from mixtures containing cyanide compounds with substantial quantities of cyanamide compounds, the cyanamide compounds usually preponderating over the cyanide compounds.

Although we preferably employ temperatures higher than can be obtained by heating the solution at atmospheric pressure, such high temperatures are not necessary for the production of the oxalate compound. For example, by heating over night at 60° C. a mixture of 31.5 parts of crude calcium cyanamide and 25 parts of crude calcium cyanide in 200 parts of water we have obtained a substantial yield of calcium oxalate.

Instead of calcium cyanamide, as mentioned in the above illustration, we may employ any cyanamide compound or any of the cyanamide derivatives of various nitrogenous compounds produced in the electric furnace and frequently referred as as carbo-nitrides. In the place of calcium cyanide, produced as previously mentioned, by the process of the Landis patent, we may employ any cyanide such as alkali earth cyanides, alkali metal cyanides, double cyanides or in fact any compounds capable of reacting like a cyanide in presence of water, and being converted into ammonia.

Although we preferably employ as one of the components of the reacting mixture a compound of a metal whose oxalate is insoluble, since in this way we insure an easy separation of the oxalate from any formate or other soluble salt that may be produced by the reaction, yet, we may employ soluble salts exclusively and may thus produce the oxalate compound in solution and may subsequently recover it by precipitation or by any other well known convenient method.

When employing alkaline earth salts we preferably employ an amount of water sufficient to keep in solution any alkaline earth formate produced by the reaction, since by so doing, we may by a simple filtration, separate the soluble formate from the insoluble oxalate, which latter is precipitated as an alkaline earth oxalate.

By varying the relative proportions of the cyanide and the cyanamide compounds we may vary the relative proportions of the formate and oxalate compounds in the reaction product. This is a very important and valuable feature of our process since it enables us to produce formates and oxalates in amounts proportioned to meet the market conditions at the time.

The combined nitrogen of both compounds contained in the mixture is recovered as ammonia as above disclosed. It is well known that many large plants throughout the world are now producing ammonia by heating calcium cyanamide in solution. When cyanamide is thus decomposed alone the combined carbon of the cyanamide is converted to a carbonate form which has little or no value at all as a by-product. By the addition of a cyanide compound to the cyanamide compound, however, we are enabled to convert a portion of the carbon component of the cyanamide into a valuable oxalate compound, thereby greatly increasing the value of the by-product.

When commercial calcium cyanamide and the crude calcium cyanide compound produced therefrom are employed in our process for the production of ammonia and an oxalate, the oxalate compound is obtained in a mixture with considerable quantities of impurities such as free lime or other lime salts, and graphite. Therefore, in order that the oxalate may be obtained in a purer state we may employ in our process filtered solutions of the crude cyanide and the crude cyanamide. These solutions may preferably be prepared by mixing the ingredients in water and filtering, or by dissolving them separately and combining the solutions. In either case the solutions are kept cool, preferably below 30° C. till ready to process. With these filtered solutions the operation consists, as before, in simply heating the mixed solutions preferably to temperatures higher than 100° C.

The employment of elevated temperatures is preferred because it renders complete the conversion to ammonia of the various nitrogenous compounds present in the mixture.

The insoluble residue remaining after processing the calcium cyanamide-cyanide mixture is treated with sulphuric acid or by various known methods for the recovery therefrom of oxalic acid. The solution from which the insoluble matter is separated contains formates which may be removed by evaporating the solution to dryness or by crystallization, and the solids thus obtained may also be treated with sulphuric acid and the solution heated to distill off any formic acid present.

It will thus be seen that this procedure enables one to produce salts of carboxylic acids by simply digesting nitrogenous compounds having cyanogen radicles in water.

It is evident that those skilled in the art may vary the details of the process as well as the nature of the product without departing from the spirit of the invention and therefore, we do not wish to be limited in the above disclosures except as may be required by the claims.

What is claimed is:—

1. The method which comprises digesting a mixture of cyanide and cyanamide compounds in the presence of water at temperatures above 60° C., the cyanamide compound preponderating in the mixture.

2. The process of claim 1 in which the digestion is carried out at pressures above atmospheric.

3. The method of forming an oxalate which comprises digesting a mixture of a cyanamide and a cyanide with water at temperatures above 60° C., the cyanamide forming a substantial part of the mixture.

4. The method of forming an oxalate and ammonia which comprises digesting at temperatures above 60° C. in the presence of water, a mixture of a cyanide and a cyanamide having the same basic radical as the oxalate to be formed, the cyanamide forming a substantial part of the mixture.

5. The method of forming an oxalate which comprises digesting a mixture of calcium cyanide and calcium cyanamide in the presence of water at temperatures above 60° C., the cyanamide forming a substantial portion of the mixture.

6. The method of forming an insoluble oxalate with a soluble formate and ammonia which comprises digesting a mixture of crude calcium cyanamide and crude calcium cyanide with water at temperatures above 60° C., removing the ammonia, and filtering the sludge produced to separate the insoluble calcium oxalate from the calcium formate solution.

7. The method which comprises digesting a mixture of calcium cyanide and calcium cyanamide in the presence of water at temperatures above 60° C. and at pressures above atmospheric until both the cyanide and cyanamide are decomposed, removing the ammonia formed and recovering the calcium oxalate from the sludge.

8. The method which comprises digesting calcium cyanide containing sodium chloride, graphite and free lime, mixed with calcium cyanamide containing graphite and free lime, with water at a temperature above 60° C. and under steam pressure for a period sufficient to decompose the cyanide and the cyanamide, and to form ammonia and calcium oxalate, and recovering said oxalate.

9. The method which comprises digesting calcium cyanide containing sodium chloride, graphite and free lime, mixed with calcium cyanamide, containing graphite and free lime with water at a temperature above 60° C. and under pressures above atmospheric for a period sufficient to decompose the cyanide and the cyanamide, boiling off the ammonia from the sludge remaining after digestion and passing steam therethrough to expel any ammonia still remaining in said sludge, filtering the sludge and recovering calcium oxalate from the solids.

10. The process of claim 9 in which the solids containing the calcium oxalate are treated with sulphuric acid to liberate oxalic acid, and said oxalic acid is recovered.

11. The method of forming and recovering oxalic acid which comprises digesting crude calcium cyanide containing sodium chloride, graphite and free lime, mixed with calcium cyanamide containing graphite and free lime, for a period exceeding one hour at a steam pressure of substantially 100 pounds of saturated steam and at a temperature corresponding to said pressure, removing the ammonia formed, filtering the solids present from the sludge obtained on digestion, treating said solids with sufficient sulphuric acid to decompose the same, separating out the oxalic acid formed and crystallizing the latter.

12. The method which comprises digesting under super-atmospheric pressure and at temperatures above 60° C., a mixture of crude calcium cyanide and a substantial quantity of crude calcium cyanamide, removing the ammonia formed and filtering the sludge produced in the digestion to separate out the insoluble calcium oxalate from the formate solution.

13. The method which comprises digesting under super-atmospheric pressure and at temperatures above 60° C., a mixture of crude calcium cyanide and crude calcium cyanamide, boiling off a substantial portion of the ammonia produced, removing the remainder of said ammonia by passing steam through the digestion sludge, filtering said sludge, treating the solids obtained with sulphuric acid, separating out the liberated oxalic acid, and crystallizing the latter.

14. The method which comprises providing a mixture containing about 31.5 parts of crude calcium cyanamide, 25 parts of crude calcium cyanide, and 200 parts of water, digesting said mixture for a period of more than one hour at a steam pressure of 100 pounds saturated steam, removing the ammonia, filtering the digestion sludge to remove solids from the formate solution, and recovering the calcium oxalate from said solids.

15. The process of claim 14 in which the solids are treated with sulphuric acid to recover oxalic acid therefrom.

16. The method which comprises dissolving out the nitrogenous constituents of masses of crude calcium cyanide and crude calcium cyanamide, mixing the liquors thus obtained to form a solution containing a preponderating quantity of calcium cyanamide, digesting said mixed liquors under super-atmospheric pressures and at temperatures above 60° C., removing the ammonia produced, and separating out the solid calcium oxalate formed from the solution containing the calcium formate.

17. The method which comprises treating calcium cyanamide and calcium cyanide with water to dissolve out substantially all the nitrogenous materials present thereby forming a solution containing a preponderance of calcium cyanamide, digesting said solution under pressure and at a temperature above 60° C., removing the ammonia produced, and filtering the digestion sludge obtained to separate solids containing oxalates from the solution containing formate.

In testimony whereof we affix our signatures.

GUY H. BUCHANAN.
GEORGE BARSKY.
KENNETH D. ASHLEY.